United States Patent
Von Tardy-Tuch et al.

(10) Patent No.: US 8,464,829 B2
(45) Date of Patent: Jun. 18, 2013

(54) METHOD FOR OPERATING A STEERING SYSTEM

(75) Inventors: Georg Von Tardy-Tuch, Kapfenhardt (DE); Daniel Lunkeit, Leonberg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 13 days.

(21) Appl. No.: 13/186,980

(22) Filed: Jul. 20, 2011

(65) Prior Publication Data

US 2012/0024615 A1    Feb. 2, 2012

(30) Foreign Application Priority Data

Jul. 27, 2010  (DE) .................. 10 2010 036 655

(51) Int. Cl.
*B62D 5/04* (2006.01)

(52) U.S. Cl.
USPC .............................. 180/443; 180/444; 701/41

(58) Field of Classification Search
USPC .................. 180/443, 444, 446; 701/41, 42, 43
See application file for complete search history.

(56) References Cited

U.S. PATENT DOCUMENTS

| 6,138,788 | A | 10/2000 | Bohner et al. |
| 2003/0014168 | A1 | 1/2003 | Williams |
| 2004/0055810 | A1 | 3/2004 | Chabaan |
| 2004/0099472 | A1 * | 5/2004 | Johnson et al. ............... 180/444 |

FOREIGN PATENT DOCUMENTS

| DE | 10032113 | 1/2002 |
| DE | 60212030 | 12/2006 |
| DE | 60218676 | 12/2007 |
| DE | 10032183 | 1/2009 |
| WO | 2006021487 | 3/2006 |

OTHER PUBLICATIONS

German Search Report issued on Mar. 24, 2011, in related Application No. DE 10 2010 036 655.2 (with partial English translation).

* cited by examiner

*Primary Examiner* — Kevin Hurley
*Assistant Examiner* — Marc A Scharich
(74) *Attorney, Agent, or Firm* — RatnerPrestia

(57) ABSTRACT

A method for operating a steering system and such a steering system are presented. The steering system includes a steering wheel which acts on a steering rack via a steering pinion of a steering column, wherein a steering torque is transmitted to the steering rack by means of the steering wheel. Furthermore, a steering assistance unit is provided, by means of which a steering assistance torque can be applied to the steering rack. A control circuit with which the steering assistance torque is regulated, is used, wherein the control circuit takes into account the mass inertia of the steering column.

7 Claims, 1 Drawing Sheet

METHOD FOR OPERATING A STEERING SYSTEM

CROSS-REFERENCE TO RELATED APPLICATION

This U.S. patent application claims priority to German Patent Application DE 102010036655.2, filed Jul. 27, 2010, which is incorporated by reference herein in its entirety.

FIELD OF THE INVENTION

The invention relates to a method for operating a steering system and to such a steering system.

BACKGROUND OF THE INVENTION

Various methods for operating steering systems of vehicles, in particular steering systems with steering assistance, are known. These so-called power-assisted steering systems are used to reduce the force which is necessary to activate the steering wheel, for example when steering in a stationary state, when maneuvering or at low velocities. For this purpose, the power-assisted steering system assists the driver during steering by virtue of the fact that the force applied by the driver for the purpose of steering, for example by means of a hydraulic pump or an electric motor, is boosted.

The power-assisted steering system here generally comprises a steering handle with which the driver predefines a steering torque which is transmitted to the steering rack which is connected to the coupled wheels. In the case of a power-assisted steering system, a steering assistance unit is now provided which comprises, for example, an electric motor and which predefines a torque or a force which acts on the steering rack and is therefore superimposed on the steering torque applied by the driver.

It is known to regulate the force acting on the steering rack by the assistance unit, as a result of which, inter alia, the inertia of the assistance unit can be compensated. In this context, an expanded regulation approach for steering mechanisms with optimized feed back is also applied. The steering system exhibits the same transmission behavior here, at least in the model, as a hydraulic power-assisted steering system (HPS—Hydraulic Power Steering).

In a dynamic case, the manual forces and torsion bar torques vary. This is due to the inertia of the steering column. However, in most situations this is not perceived by the driver. However, in the case of return movement behavior the influence is marked. This results from the inertia of the steering column and the elasticity of the torsion bar. The torsion bar must firstly accelerate the steering column, in particular in the case of a so-called hands-off operation (release of the steering wheel), in order to become destressed. The assistance force is not resumed until this destressing process occurs, and the steering system can then move back. It is to be noted that purely mechanical steering mechanisms do not exhibit this time delay.

Document DE 602 18 676 T2, which is incorporated by reference herein, discloses a method for controlling a vehicle steering device, in particular a power steering device. In the described method, at least one signal which forms a display for a state of the vehicle during a steering maneuver is provided by means of a control device. The signal is analyzed in order to determine a desired operator control torque which is to be applied to a hand wheel of the vehicle. Furthermore, the inertia and the acceleration of the hand wheel are determined, the hand wheel torque being calculated from said inertia and acceleration. A column torque is determined by means of a torsion rod. The fault signal, with which the steering device is controlled, is generated by subtracting the hand torque and the steering torque from the desired operator control torque.

Document DE 100 32 113 A1, which is incorporated by reference herein, describes a steering system having a control circuit for at least one steering actuator and a control circuit for at least one steering wheel actuator. The intention is to use the presented steering system to improve the regulating quality of the torque at the steering hand wheel. For this purpose, the steering wheel actuator is connected to the steering actuator via a control circuit. The control circuitry of the steering wheel actuator has a pilot controller. This pilot controller is determined by the characteristic variables of the inertia, angular acceleration at the steering hand wheel and the transmission ratio of a transmission.

A method for operating a steering system and for providing steering assistance in a vehicle is known from document WO/2006/021487 A1, which is incorporated by reference herein. In the vehicle, a steering wheel, a steering shaft and a steering mechanism are provided, wherein a motor acting on the steering mechanism is controlled as a function of a steering torque which is measured by a steering torque sensor. It is described here that the measured steering torque is reduced by a correction variable which is formed from the inertia torque and the rotational acceleration of the steering wheel.

SUMMARY OF THE INVENTION

An object of the present invention is to develop a method for operating a power-assisted steering system with which good return behavior can be achieved, with the result that, in particular in the case of axes which are configured in a stable fashion, rapid self-stability is brought about.

This object is achieved according to aspects of the invention with a method for operating a steering system (10) having a steering wheel (12) which acts on a steering rack (18) via a steering pinion (16) of a steering column (14), wherein a steering torque is transmitted to the steering rack (18) by means of the steering wheel (12), and having a steering assistance unit (22), by means of which a steering assistance torque can be applied to the steering rack (18), wherein a control circuit (24, 30), with which the steering assistance torque is regulated, is used, wherein the control circuit (24, 30) takes into account the mass inertia of the steering column (14), and a steering system having a steering wheel (12) which acts on a steering rack (18) via a steering pinion (16) of a steering column (14), wherein a steering torque can be transmitted to the steering rack (18) via the steering wheel (12), and having a steering assistance unit (22), by means of which an assistance torque can be applied to the steering rack (18), wherein a control circuit (24), with which the assistance torque can be regulated, is provided, wherein the control circuit (24) takes into account the mass inertia of the steering column (14). Developments of the invention can be found in the dependent claims and the description.

The method according to aspects of the invention serves to operate a steering system having a steering wheel which acts on a steering rack via a steering pinion of a steering column, wherein a steering torque is transmitted to the steering rack by means of the steering wheel, and having a steering assistance unit, by means of which a steering assistance torque can be applied to the steering rack, wherein a control circuit, with which the steering assistance torque is regulated, is used, wherein the control circuit takes into account the mass inertia of the steering column.

By including the inertia of the steering column in the assistance behavior it is possible to regulate directly the manual force of the driver. For this purpose, the acceleration behavior of the steering column is observed. Through knowledge of the forces acting on the steering rack, the force transmitted to the steering column is also known. The sum of the acting forces is known from the acceleration of the steering column. The remaining unknown, the manual force, can therefore be determined.

It is also possible to take into account the mass inertia of the steering assistance unit and/or the mass inertia of the steering wheel.

With the method it is possible to determine a manual torque of a driver, for which purpose, in a refinement of the method, the acceleration behavior of the steering column is observed.

In one refinement there is provision for the method to be used for self-stabilization of a vehicle, in particular in the case of a hands-off operation.

A steering system is also proposed, having a steering wheel which acts on a steering rack via a steering pinion of a steering column, wherein a steering torque can be transmitted to the steering rack via the steering wheel. The steering system also comprises a steering assistance unit, by means of which a steering assistance torque can be applied to the steering rack, wherein a control circuit, with which the steering assistance torque can be regulated, is provided, wherein the control circuit takes into account the mass inertia of the steering column.

In one embodiment, the steering assistance unit comprises an electric motor. However, of course other steering assistance units such as, for example, hydraulically operated units with hydraulic pumps, are also conceivable.

BRIEF DESCRIPTION OF THE DRAWING

Further advantages and refinements of the invention can be found in the description and the appended drawing.

It goes without saying that the features presented above and the features still to be explained below can be used not only in the respectively specified combination but also in other combinations or alone, without departing from the scope of the present invention.

DETAILED DESCRIPTION OF THE DRAWINGS

The invention is illustrated schematically in the figures on the basis of embodiments, and is described with reference to the figures.

Figure 1:
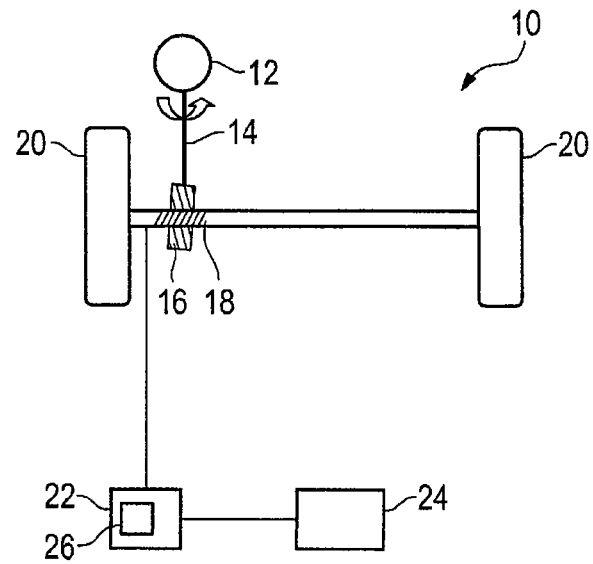
FIG. 1 shows an embodiment of the invention in a schematic illustration.

FIG. 1 illustrates a steering system, denoted in its entirety by the reference number 10. The steering system 10 comprises a steering wheel 12, a steering column 14, a steering pinion 16, a steering rack 18, coupled wheels 20, a steering assistance unit 22 and a control circuit 24. The steering assistance unit 22 comprises an electric motor 26.

The wheels 20 act on the steering rack 18 via steering tie rods (not shown). The driver applies a manual torque via the steering wheel 12, which manual torque is transmitted to the steering rack 18 via the steering column 14 and the steering pinion 16. The steering column 14 can be a mechanical, hydraulic or electric steering column.

With the steering assistance unit 22, an additional torque, specifically a steering assistance torque or a steering assistance force, is transmitted to the steering rack 18. The additional torque is dependent on the manual torque applied by the driver, and is additionally regulated using the control circuit 24, which in turn takes into account the inertia of the steering column 14. In this way it is possible to regulate directly the manual force or the manual torque of the driver, for which purpose the acceleration behavior of the steering column 14 is observed.

If the forces is acting on the steering rack 18 are known, the force transmitted to the steering column 14 is also known. On the basis of the acceleration of the steering column 14, the sum of the forces acting can be determined. It is therefore possible to determine the manual force or the manual torque as a remaining unknown.

Figure 2:
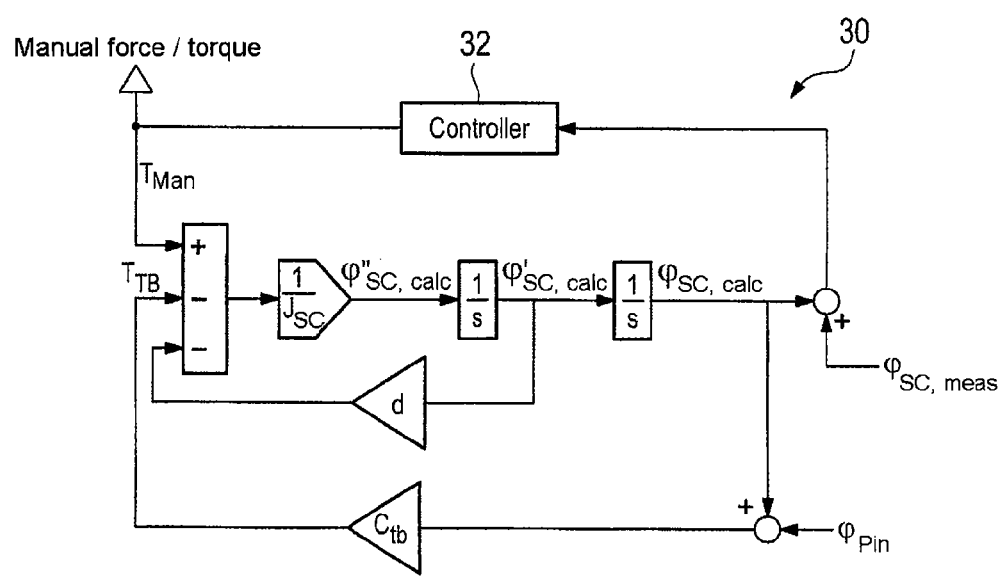
FIG. 2 shows a control circuit in a schematic illustration.

FIG. 2 illustrates an embodiment of a control circuit 30 which has a controller or regulator 32. The control circuit 32 serves to regulate the manual force or the torque.

The variables shown are defined as follows:
$T_{Man}$ manual torque of the driver
$T_{TB}$ torque applied by the torsion bar
$\phi_{SC,calc}$ calculated steering column angle
$\phi_{SC,meas}$ measured steering column angle
$\phi_{Pin}$ angle of the steering pinion
$J_{SC}$ inertia of the steering column
d damping of the steering column
$C_{tb}$ rigidity of the torsion bar

The invention claimed is:

1. A method for operating a steering system including a steering wheel which acts on a steering rack via a steering pinion of a steering column, said method comprising the steps of: (i) transmitting a steering torque to the steering rack by means of the steering wheel, (ii) calculating, by means of a control circuit, a steering assistance torque as a function of a mass inertia of the steering column, and (iii) applying the steering assistance torque to the steering rack by means of a steering assistance unit.

2. The method as claimed in claim 1 further comprising the step of calculating the steering assistance torque as a function of a mass inertia of the steering assistance unit.

3. The method as claimed in claim 1 further comprising the step of calculating the steering assistance torque as a function of a mass inertia of the steering wheel.

4. The method as claimed in claim 1 further comprising the step of determining a manual torque of a driver.

5. The method as claimed in claim 1 further comprising the step of observing an acceleration of the steering column.

6. A steering system comprising:
  a steering wheel which acts on a steering rack via a steering pinion of a steering column, wherein a steering torque is transmitted to the steering rack via the steering wheel,
  a control circuit that is configured to calculate a steering assistance torque as a function of a mass inertia of the steering column, and
  a steering assistance unit by means of which the steering assistance torque is applied to the steering rack.

7. The steering system as claimed in claim 6, in which the steering assistance unit comprises an electric motor.

* * * * *